United States Patent Office 2,716,302
Patented Aug. 30, 1955

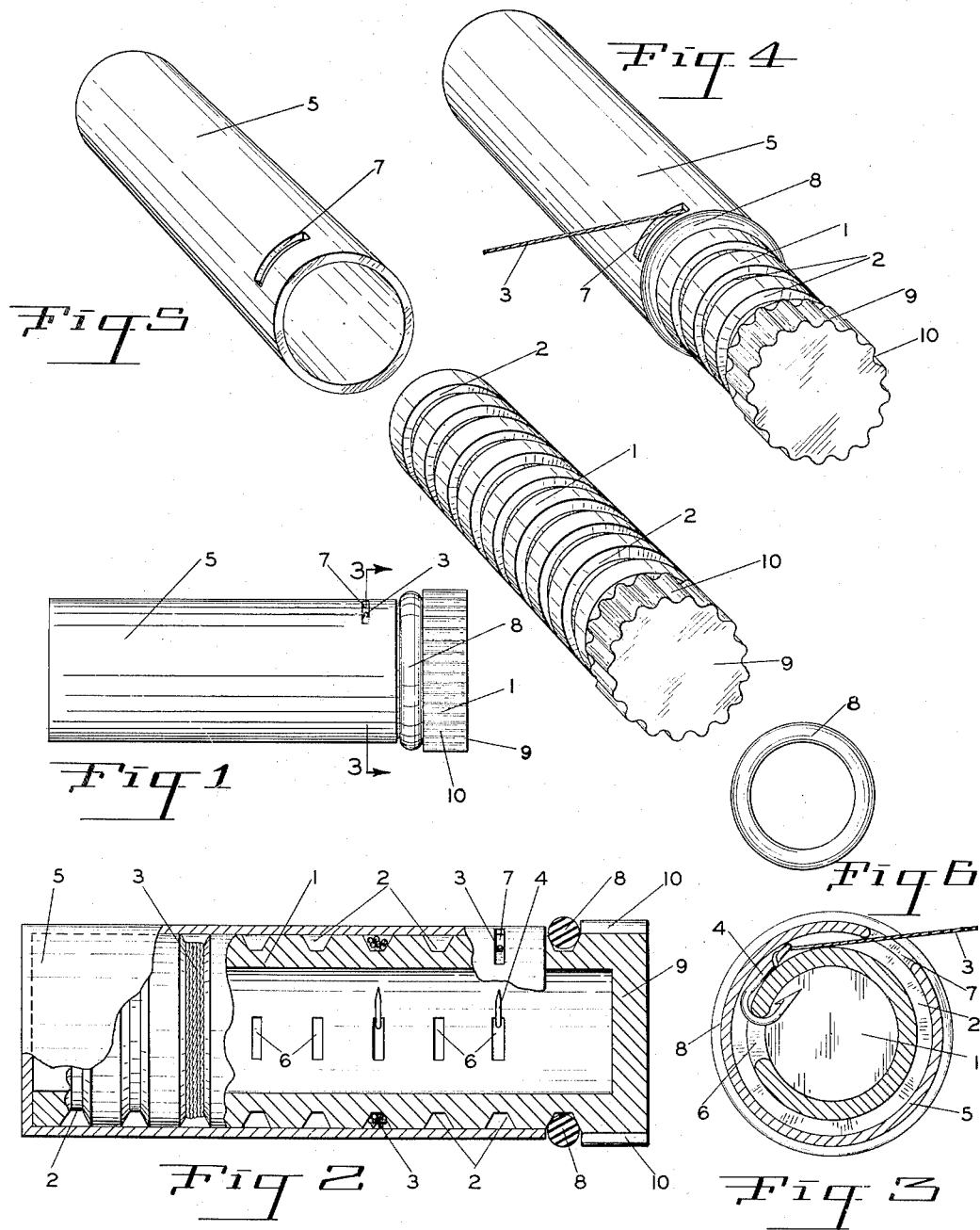

2,716,302

CONTAINERS FOR FISH HOOKS AND LEADERS

Floyd E. Dutton, Wenatchee, Wash.

Application January 7, 1952, Serial No. 265,227

5 Claims. (Cl. 43—57.5)

This invention relates to containers for fish hooks and leaders.

The primary object of the invention is to provide a container for hooks and leaders wherein each hook and leader can be stored in a separate compartment within the container, means being provided for anchoring the hooks and guiding the leaders into the said compartments by rotating the cap of the container.

A further object of the invention is the provision of a container wherein one hook and leader can be removed at a time by manipulating the cap of the container, so that the leader and hook can be removed from their individual storage grooves.

These and other incidental objects will be apparent in the drawings, specification and claims.

Referring to the drawings:

Figure 1 is a side view of my new and improved hook and leader container.

Figure 2 is an enlarged central longitudinal partial sectional view of the container shown in Figure 1.

Figure 3 is a sectional view, taken on line 3—3 of Figure 1.

Figure 4 is a perspective view of a leader being installed into one of the grooves of the container.

Figure 5 is a perspective view of the container removed from its casing.

Figure 6 is a side view of the resilient or flexible ring used to guide the casing in relation to the storage grooves formed in the container.

Referring more specifically to the drawings:

My new and improved hook and leader container comprises a preferably hollow cylindrical body member 1, having grooves 2 running circumferentially therearound, adapted to receive and hold the leaders 3 and their hooks 4. A cap 5 is rotatably and slidably, but snugly, applied over the body member 1 and is adapted to hold the hooks and leaders within the grooves 2 after they are wrapped therein.

Openings 6 are formed in the grooves 2 and are adapted to receive the hooks as illustrated in Figure 3. The cap 5 is provided with a slot 7 through its circumferential wall adjacent the open end thereof. When applying a hook and leader to the container, the slot 7 of the cap 5 is registered with one of the openings 6, the hook 4 is inserted through the slot 7 into the opening 6 and hooked, the leader 3 extending through the slot as indicated particularly in Figures 3 and 4. The operator revolves the cap about the body 1 of the container clockwise in the position shown in Fig. 3, which threads the leader into the selected groove.

In order to position the cap in regard to the body member while rotating the cap or applying the leader in a selected groove, a rubber or elastic ring 8 is applied to the adjacent groove, as shown in Figure 4. This guides the end of the cap, keeping the slot 7 in line with the selected groove. The slot 7 is preferably spaced from the end of the cap so as to register with the groove 2 next to the groove in which the ring is seated. Figures 1 and 2 illustrate the position of the ring and cap when the container is being carried by the fisherman.

When it is desired to remove one of the hooks and leaders, the cap is moved along the body 1 until a desired leader is uncovered, at which time it can be unwrapped. The end 9 of the body 1 is preferably knurled providing the handle portion 10 so that the operator can hold the same while revolving the cap 1.

From the above description it can be readily seen that fishermen can carry many hooks and leaders without tangling them. The container is hollow and water tight so that it will float in case it is dropped in water.

What I claim is:

1. A container for fish hooks and leaders, comprising a cylindrical hollow body having a plurality of circumferential grooves therein, a slot in the bottom of each groove, a handle portion on one end of said body and a cylindrical cover rotatably and slidably mounted on said body, said cover having a slot therein for registration with one of said grooves and through which a hook and leader may be passed to anchor said hook in the groove slot and allow said leader to be wound in said groove upon rotation of the cover with respect to the body, and a ring adapted to be seated in one of said grooves to limit the sliding movement of said cover to register the slot therein with another of said grooves.

2. A container as defined in claim 1 wherein said ring is elastic.

3. A container as defined in claim 1 wherein said cover slot is spaced from one end of said cover a distance substantially equal to the distance between said grooves whereby said cover slot will register with the groove immediately adjacent the groove in which the ring is seated.

4. A container for fish hooks and leaders, comprising a cylindrical body having a plurality of longitudinally spaced circumferential grooves, each groove having a recess in the bottom thereof adapted to receive a hook with the leader wrapped in the respective groove, and a cylindrical cover rotatably and longitudinally movable on said body and having a slot adapted to be registered with a selected groove and through which the hook and leader may be passed.

5. A container for fish hooks as defined in claim 4, and means adapted to limit the longitudinal movement of the cover to register the slot therein with a selected groove.

References Cited in the file of this patent

UNITED STATES PATENTS

| | | |
|---|---|---|
| 204,758 | Rice | June 11, 1878 |
| 1,454,429 | Dresser | May 8, 1923 |
| 1,634,030 | Korkames | June 28, 1927 |
| 2,553,097 | Lampe | May 15, 1951 |
| 2,555,397 | Coward | June 5, 1951 |
| 2,585,327 | Johnson et al. | Feb. 12, 1952 |